Dec. 2, 1930.  J. D. ELMS  1,783,463
MOTION PICTURE CAMERA
Filed April 10, 1928  3 Sheets-Sheet 3
Fig. 5.
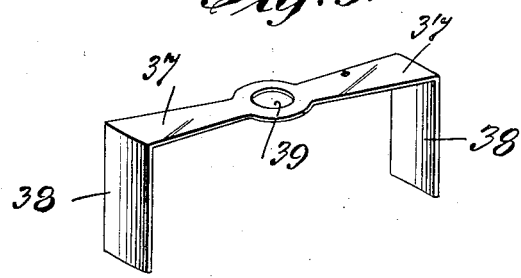
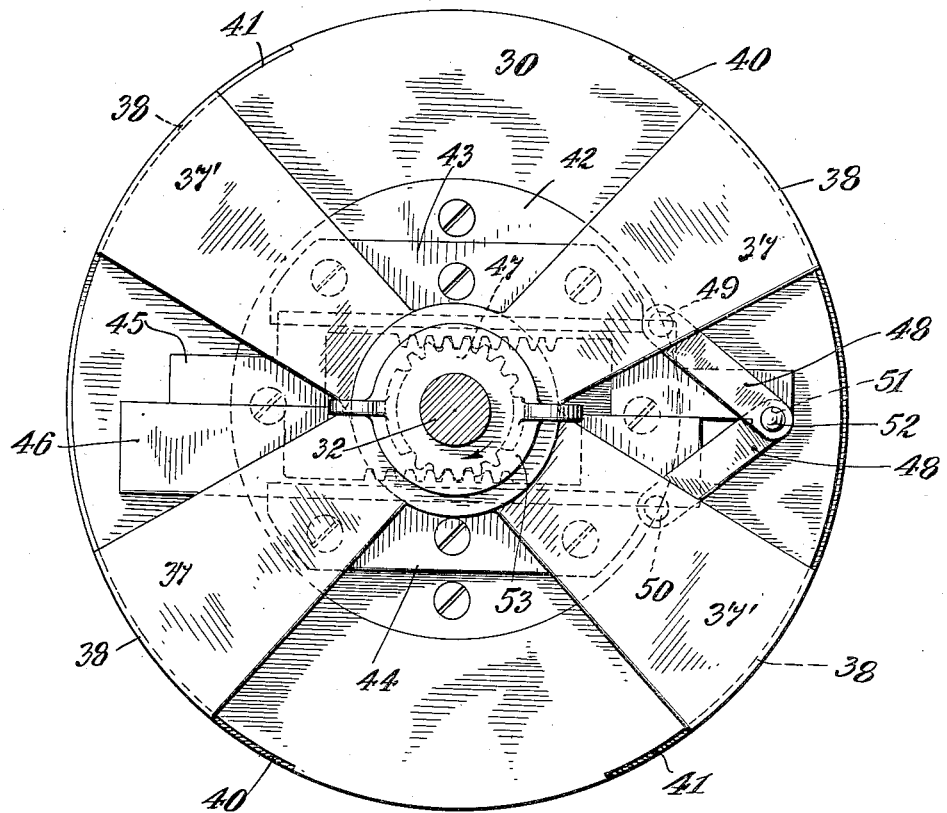
Fig. 4.
Inventor
John D. Elms
By his Attorney Patented Dec. 2, 1930

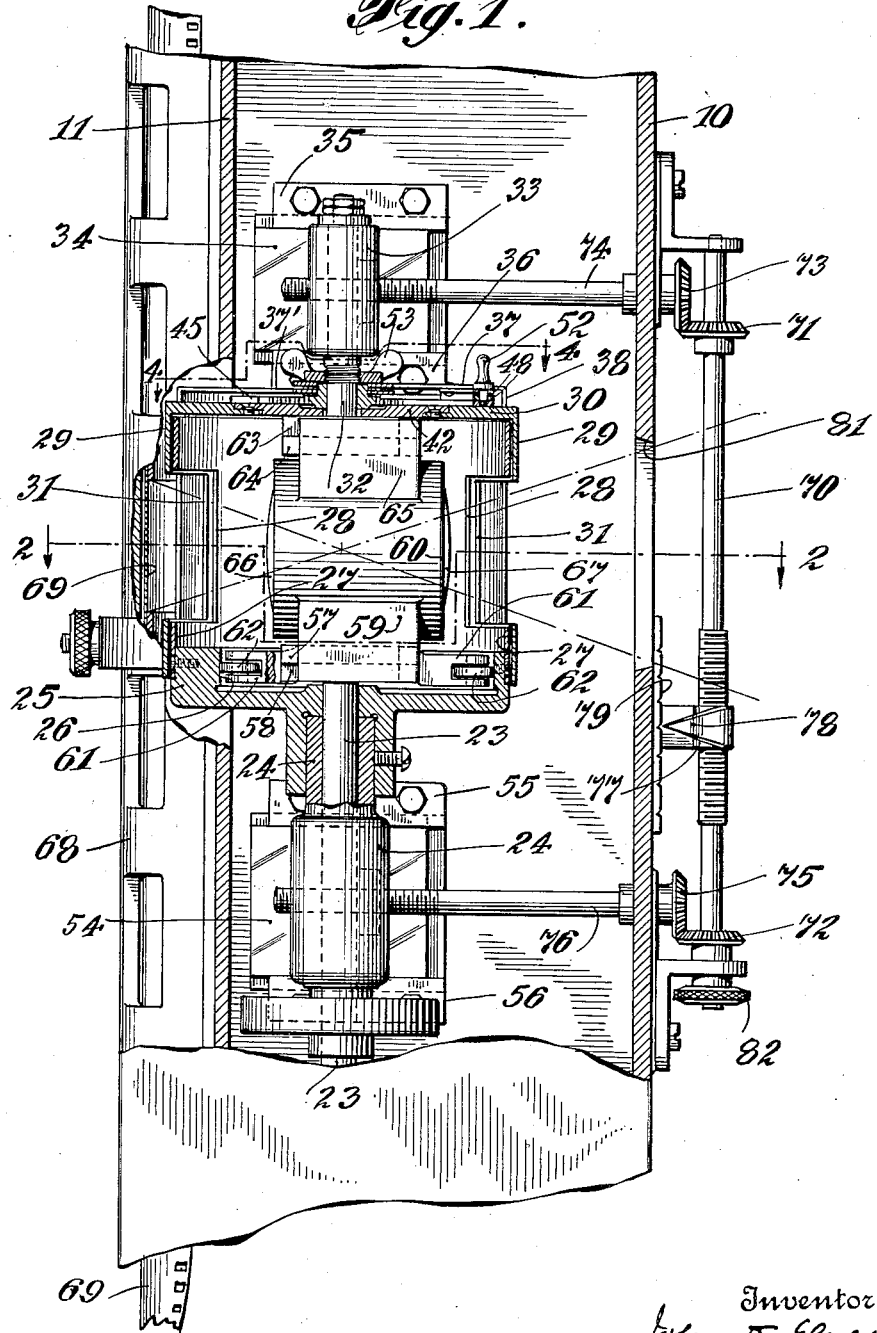

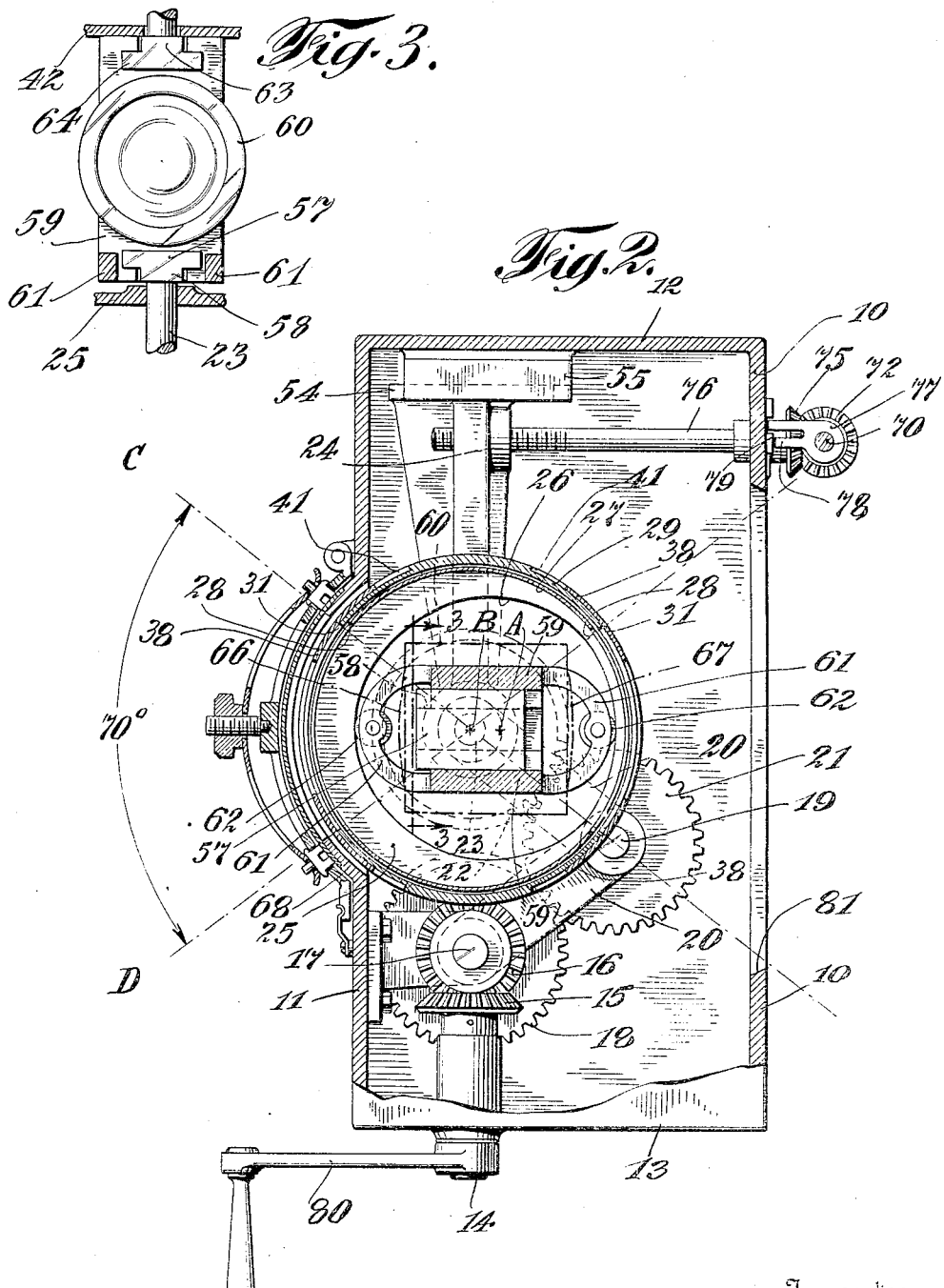

1,783,463

UNITED STATES PATENT OFFICE

JOHN D. ELMS, OF ST. GEORGE, NEW YORK, ASSIGNOR, BY MESNE ASSIGNMENTS, TO FELMS REVO CORPORATION, OF NEW YORK, N. Y., A CORPORATION OF NEW YORK

MOTION-PICTURE CAMERA

Application filed April 10, 1928. Serial No. 268,904.

My invention relates to motion picture cameras and refers particularly to motion picture cameras containing revoluble multi-ended lenses.

Motion picture cameras having revoluble multi-ended lenses, as, for instance, double-ended lenses, have valuable attributes in the taking of motion pictures, but considerable difficulty is experienced in producing lenses of this character having coincident nodal points.

As it is essential that the nodal point of a lens have a definite distance relationship to the film, in order that clear and well defined photographic impressions may be made, it is evident that, if the nodal points of a double-ended lens are not coincident with each other, the photographic images will not be equally clear and defined, unless the nodal points are each brought into the proper relationship with the film during the operation of each lens as a photographic medium.

It is evident, therefore, that in a revolving double-ended lens in which the nodal points are non-coincident, some means must be employed whereby each nodal point will be brought into proper relationship with the film while the lens of that nodal point is making a photographic impression upon the film.

As the moving mechanism of a motion picture camera must be free from vibration, such mechanism must be of a character to move quietly and without jars, or shocks.

Further, the nodal point must retain its film relationship during the entire photographic impression period.

The device must also have a proper and effective adjustable shutter for the taking of pictures through both ends of the lens and the lens must be capable of proper focussing during the operation of the camera.

The device of my invention accomplishes all of the above described, and other, desirable results and presents a means whereby a revoluble multi-ended lens having non-coincident nodal points may be effectively employed in the making of motion pictures, the nodal points being brought into proper distance relationship with the film during the operation of the device.

The objects of my device and the means for accomplishing the same will be evident upon a consideration of my specification and its accompanying drawings.

In the accompanying drawings, illustrating one form of the device of my invention, similar parts are designated by similar numerals.

Figure 1 is a vertical section of one form of the device of my invention.

Figure 2 is a section through the line 2—2 of Figure 1.

Figure 3 is a section through the line 3—3 of Figure 2.

Figure 4 is a section through the line 4—4 of Figure 1.

Figure 5 is a perspective view of one of the shutter wings.

The particular form of the device of my invention, shown in the accompanying drawings, comprises a casing having the front 10, the back 11, the ends 12 and 13 and a top and bottom (not shown).

A revoluble driving shaft 14 carries the bevel gear 15 meshing with the bevel gear 16 of the revoluble shaft 17, which also carries the gear 18. The shaft 17 is connected to the revoluble shaft 19 by means of the links 20, 20, the shaft 19 carrying the gear 21 meshing with the gear 18.

The gear 21 meshes with the gear 22 carried by the driven shaft 23.

The shaft 23 is revoluble within a stationary sleeve 24 to which is attached a cam member 25 having a cam run-way 26 therein. The cam run-way 26 is not circular throughout, all lines drawn through a common point and terminating in the periphery being of equal length, those portions of the run-way through which the lenses move during photographic periods being circular.

Fixedly attached to the cam member 25 is a cylindrical member 27 having oppositely positioned openings 28, 28 therein.

Positioned upon and around the member 27 is a revoluble outer cylindrical member having the side 29, the top 30 and the oppositely positioned openings 31, 31.

A shaft 32 is revoluble in the bearing 33 carried by the slide plate 34, the latter being slidable within the two fixedly positioned grooved plates 35 and 36.

Revolubly and slidable upon the shaft 32 are two shutter wings, each comprising a base 37 and two dependent wings 38, 38, the shaft passing through the opening 39. The member 30 has slots 40, 40, 41, 41, within which the dependent wings 38, 38, 38, 38, are movable. In order to distinguish between the two shutter wings, one is shown in prime numerals.

Fixedly attached to the member 30 is the annular plate 42, to which are attached the two guide plates 43, 44. Slidable within the guide plate 43 is the ratchet plate 45, and slidable within the guide plate 44 is the ratchet plate 46. The shaft 32 carries the loosely mounted pinion 47 meshing with the slidable guide plates 45 and 46. The shutter wings 37, 37' are pivotally connected by the links 48, 48 at 49, 50, which, in turn, are pivotally connected to the slidable ratchet member 45 at 51 and carry the extended handle 52. A threaded wing-nut 53 meshes with the threaded portion of the shaft 32.

The bearing 24 is integral with the slidable plate 54 slidable within the guide plates 55 and 56.

Fixedly attached to the shaft 23 is the stepped guide 57, 58. Slidable upon the stepped guide is a supporting block 59 to which is attached a lens housing 60. The supporting block also carries the two curved cam arms 61, 61, each carrying a roller 62 at its outer extremity.

The shaft 32 also carries a stepped guide 63, 64 similar to 57, 58 upon which is the slidable supporting block 65, which, in turn, is attached to the lens housing 60.

Within the lens housing is a double-ended lens having the two end lenses 66 and 67—A being the nodal point of the lens 66 and B being the nodal point of lens 67.

Within the curved film housing and guide 68 is a photographic film 69 capable of intermittent vertical movement by means usually employed for this purpose.

Exterior of the casing and attached to the casing front 10 is a revoluble shaft 70 carrying the bevel gears 71 and 72, gear 71 meshing with the bevel gear 73 carried by the shaft 74, the threaded portion of which meshes with a threaded opening in the slidable bearing 34 and the bevel gear 72 meshing with the bevel gear 75 carried by the shaft 76, the threaded portion of which meshes with a threaded opening in the slidable bearing 54. The threaded nut 77 meshes with the threaded portion of the shaft 70 and the pointer 78 carried thereby is therefore movable along the counter, or marker, 79 carried by the casing front 10.

The operation of the device is as follows:

The wing nut 53 is raised and the two shutter wings 37 and 37' are moved with respect to each other by moving the handle 52 and, when they are separated the required distance, the wing nut 53 is screwed down tightly, thus binding the shutter wings in fixed position.

The driving shaft 14 is then revolved by means of the handle 80, thus revolving the wing shutters 37, 37', the casing 29 and the lens housing 60.

Each revolution of the lens housing 60 and the double-ended lens carried thereby will thus impress two photographic images upon the film 69 through the opening 81 of the casing front 10.

As the nodal point B is in the axis of revolution of the shaft 23 and in proper position with respect to the film 69, in order to make a correct photographic image thereon through the lens 67, it is evident that the nodal point A of the lens 66 must be brought into the axis of revolution of the shaft 23 when the image is made through that lens.

This is accomplished by means of the movement of the lens housing from the position shown in Figure 2, in which the nodal point B of lens 67 is in the axis of revolution of the shaft 23, to a position in which the nodal point A occupies that position, as follows:

As the cam run-way 26 is not circular, the supporting block 59 will slide along the stepped guide 57, 58 carrying the lens housing 60 with it, the block 59 being moved by the abutment of the rollers 62, 62 upon the cam runway 26, the latter being of such contour that the nodal point B will be in the axis of revolution of the shaft 23 during its movement through the 70° arc CD, while the lens 67 is directed outwardly and that the nodal point A will be in the axis of revolution of the shaft 23 during its movement through the 70° arc CD, while the lens 66 is directed outwardly.

It will thus be seen that a constant revolution of the driving shaft will cause the double-ended lens to revolve, while, at the same time, causing the two nodal points to always be in proper position with respect to the film during the photographic period.

The lens may be focused during its revolution by turning the nut 82 carried by the shaft 70, which causes the two slidable members 34 and 54 to move simultaneously, carrying the lens and operating mechanism with them.

It will thus be noted that the device of my invention presents a means whereby a revoluble double-ended lens of non-coincident nodal points may be employed with the automatic placement of each nodal point in proper photographic position during the exposure period.

I do not limit myself to the particular size, shape, number, or arrangement, of parts, as shown and described, as these are given simply as a means for clearly describing my invention.

What I claim is:—

1. In a motion picture camera, in combination, a revoluble double-ended lens of non-coincident nodal points, means for revolving said lens and means for bringing each said nodal point into the axis of revolution during each revolution of said lens.

2. In a motion picture camera, in combination, a revoluble double-ended lens of non-coincident nodal points, means for revolving said lens and means for bringing each said nodal point into the axis of the revolution during each revolution of said lens, and maintaining each nodal point in said position during the photographic period of its lens.

3. In a motion picture camera, in combination, a revoluble double-ended lens of non-coincident nodal points, means for revolving said lens and cam means for bringing each said nodal point into the axis of revolution during each revolution of said lens, and maintaining each nodal point in said position during the photographic period of its lens.

4. In a motion picture camera, in combinaaion, a revoluble double-ended lens of non-coincident nodal points, means for revolving said lens and means for focussing said lens during its revolution.

5. In a motion picture camera, in combination, a revoluble double-ended lens of non-coincident nodal points, means for revolving said lens, means for intermittently moving a film and means for bringing each said nodal point into proper photographic position with respect to said film during each revolution of said lens.

6. In a motion picture camera, in combination, a revoluble double-ended lens of non-coincident nodal points, means for revolving said lens, means for intermittently moving a film and cam means for bringing each said nodal point into proper photographic position with respect to said film during each revolution of said lens.

7. In a motion picture camera, in combination, a revoluble double-ended lens of non-coincident nodal points, means for revolving said lens, means for intermittently moving a film, means for bringing each said nodal point into proper photographic position with respect to said film during each revolution of said lens and means for focussing said lens during its revolution.

8. In a motion picture camera, in combination, a cam runway, a cam revoluble in said runway, means for revolving said cam, a lens housing carried by said cam, a double-ended lens of non-coincident nodal points within said housing, the contour of said runway formed to bring each nodal point into the axis of revolution during each revolution of said lens.

9. In a motion picture camera, in combination, a cam runway, a cam revoluble in said runway, means for revolving said cam, a lens housing carried by said cam, a double-ended lens of non-coincident nodal points within said housing, means for intermittently moving a film, the contour of the cam runway formed to bring each nodal point into proper photographic position with respect to said film during each revolution of said lens.

10. In a motion picture camera, in combination, a revoluble double-ended lens of non-coincident nodal points, means for revolving said lens, means for bringing each said nodal point into the axis of revolution during each revolution of said lens and a shutter revoluble in the same axis as the lens.

11. In a motion picture camera, in combination, a stationary housing having opposite openings therein, a revoluble double-ended lens having non-coincident nodal points within said housing, means for revolving said lens and means for bringing each nodal point into the axis of revolution during each unexposed period and maintaining it in that position during each exposed period during each revolution of said lens.

12. In a motion picture camera, in combination, a stationary housing having opposite openings therein, a revoluble double-ended lens having non-coincident nodal points within said housing, means for revolving said lens, means for bringing each nodal point into the axis of revolution during each unexposed period and maintaining it in that position during each exposed period during each revolution of said lens and means for closing said housing openings during each unexposed period.

13. In a motion picture camera, in combination, a stationary housing having opposite openings therein, a revoluble double-ended lens having non-coincident nodal points within said housing, means for revolving said lens, means for bringing each nodal point into the axis of revolution during each unexposed period and maintaining it in that position during each exposed period during each revolution of said lens and means revoluble in the axis of said lens revolution for closing said housing openings during each unexposed period.

14. In a motion picture camera, in combination, a stationary housing having opposite openings thereon, a revoluble double-ended lens having non-coincident nodal points within said housing, means for revolving said lens, means for bringing each nodal point into the axis of revolution during each unexposed period and maintaining it in that position during each exposed period during each revolution of said lens and shutter means having adjustable openings therein revoluble in the axis of said lens revolution for closing said housing openings during each unexposed period.

15. In a motion picture camera, in combination, a stationary housing having opposite openings therein, a revoluble double-ended lens having non-coincident nodal points points within said housing, cam means for revolving said lens, means for bringing each nodal point into the axis of revolution during each unexposed period and maintaining it in that position during each exposed period during each revolution of said lens, shutter means having adjustable openings therein revoluble in the axis of said lens revolution for closing said housing openings during each unexposed period and means for focussing said lens during its revolution.

16. In a motion picture camera, in combination, a revoluble shaft, means for revolving said shaft, a stationary cam runway, a guide member fixedly attached to said shaft and within said runway, a slidable member within said guide member, a revoluble double-ended lens with non-coincident nodal points carried by said slide member, a cam carried by said slide member and revolubly abutting upon said cam runway, the contour of said runway being such as to cause the revolution of the cam to bring each nodal point in the axis of revolution of the revoluble shaft during each revolution thereof.

Signed at New York city, in the county of New York and State of New York, this 6th day of April, 1928.

JOHN D. ELMS.